United States Patent
Karidis

[19]

[11] Patent Number: 6,006,243
[45] Date of Patent: Dec. 21, 1999

[54] FOLDABLE PERSONAL COMPUTER WITH DETACHABLE COVER SECTION

[75] Inventor: John P. Karidis, Ossining, N.Y.

[73] Assignee: International Business Machines Corporation, Armonk, N.Y.

[21] Appl. No.: 08/866,003

[22] Filed: May 30, 1997

[51] Int. Cl.⁶ .................................................. G06F 1/16
[52] U.S. Cl. ...................... 708/100; 361/680; 361/681; 361/683
[58] Field of Search ................ 364/708.1; 361/680, 361/681, 683; 708/100; 345/168, 87, 7; 463/34

[56] References Cited

U.S. PATENT DOCUMENTS

| | | | |
|---|---|---|---|
| 4,571,456 | 2/1986 | Paulsen et al. | 179/2 C |
| 4,589,659 | 5/1986 | Yokoi et al. | 273/1 GC |
| 5,034,858 | 7/1991 | Kawamoto et al. | 361/394 |
| 5,103,376 | 4/1992 | Blonder | 361/393 |
| 5,157,585 | 10/1992 | Myers | 361/380 |
| 5,175,672 | 12/1992 | Conner et al. | 361/393 |
| 5,200,913 | 4/1993 | Hawkins et al. | 364/708 |
| 5,206,790 | 4/1993 | Thomas et al. | 364/380 |
| 5,229,757 | 7/1993 | Takamiya et al. | 340/711 |
| 5,247,285 | 9/1993 | Yokota et al. | 345/169 |
| 5,260,884 | 11/1993 | Stern | 364/708 |
| 5,260,885 | 11/1993 | Ma | 364/708 |
| 5,278,779 | 1/1994 | Conway et al. | 364/708.1 |
| 5,345,362 | 9/1994 | Winkler | 361/681 |
| 5,383,138 | 1/1995 | Motoyama et al. | 364/708.1 |
| 5,416,730 | 5/1995 | Lookofsky | 364/708.1 |
| 5,539,615 | 7/1996 | Sellers | 361/680 |
| 5,544,005 | 8/1996 | Horikoshi et al. | 361/680 |
| 5,559,531 | 9/1996 | Schiffer | 345/168 |
| 5,673,169 | 9/1997 | Wicks | 361/680 |
| 5,751,547 | 5/1998 | Honda et al. | 361/686 |
| 5,751,548 | 5/1998 | Hall et al. | 361/686 |
| 5,757,615 | 5/1998 | Donahoe et al. | 361/687 |
| 5,784,253 | 7/1998 | Ooka et al. | 361/686 |
| B1 4,571,456 | 8/1995 | Paulsen et al. | 379/96 |

Primary Examiner—Joseph E. Palys
Assistant Examiner—Omar A. Omar
Attorney, Agent, or Firm—Bernard D. Bogdon

[57] ABSTRACT

A foldable display screen notebook computer with touch screen operational capabilities which folds outward to form a viewing angle for the display screen which can be varied as a function of the axis of pivot of the display screen and where the display section and its component back section are detachable from the base section providing a modular concept which facilitates multiple computer function capability while minimizing cost expenditure and size for features which are not needed or which are not desirable during the operation under consideration. The modularity options provide for a notebook computer of minimal physical size and affordability. The display screen can be oriented to provide a space saving foot print and includes optional electronics and programming to provide, amongst other features, a portrait view of the screen.

32 Claims, 5 Drawing Sheets

FOLDABLE PERSONAL COMPUTER WITH DETACHABLE COVER SECTION

RELATED PATENT FILING

This patent specification has been filed concurrently with and is cross referenced to assignee's related patent specifications Ser. No. 08/866,002 and Ser. No. 08/866,008.

FIELD OF THE INVENTION

This invention relates to a mobile personal computer system with a front panel display hinged from a cover member of the personal computer which cover member is detachable from the system base, and more particularly to a compact notebook computer which houses a flat panel display foldable into the base of the computer system to form a cover of a portable personal computer which is detachable from the base section.

BACKGROUND OF THE INVENTION

Today's notebook computers provide many valuable characteristics. They are small and light. They are battery operated and easily portable. They are highly integrated and have no cables in their basic configuration, making them easy to set up and move. However, these products have typically been very business-oriented (i.e., they do not usually feature an overabundance of high-quality multimedia capability relative to typical home computers) and also, they have been priced much higher than a desktop PC of equivalent function.

In contrast, a typical desktop PC provides a great deal of processing and multimedia capability at very competitive prices. However, these systems are not small, and generally not lightweight. They operate only on AC-power, and they generally have a multitude of cables. The combination of size, weight, and cabling makes these systems quite unwieldy to set up, and typically requires the user (both at home and at the office) to dedicate a significant amount of space and furniture for the desktop PC.

Many customers, however, do not value some notebook attributes such as extremely low weight and substantial battery life, but would prefer a smaller footprint or space occupied by the unit, simpler cabling, and easier transportability than a typical desktop computer provides. In the business world, such a product might be useful in dense, "open" office layouts where cubicle space is at a premium.

In the home market, many users cannot afford the expense or afford to dedicate a lot of space for a desktop PC. Possibly, they may already have one or more desktop PCS and don't want to dedicate another large space for their next PC. Indeed, they might prefer to fit their next PC into existing spaces, such as on a child's bedroom desk, a small desk in their kitchen, or perhaps even on the kitchen counter. Further, their interest is to purchase only that special or tailored system which meets their immediate needs, but with the option and flexibility to, at some later date, purchase components or modules which enhance the operation of their space efficient system. Space efficiency is particularly important in many countries, including Japan just to mention one, where the typical unmarried or single person, it has been reported, typically lives in a 340 square foot apartment, while a typical family of four (parents plus two preschool children) lives in a 750 square-foot apartment.

If possible, of course, customers would prefer that these smaller machines cost no more than a much larger desktop PC. That is presently not the case and not possible under today's manufacturers' profit goals, because of the high cost of many notebook computer components, including the liquid crystal display, low-power processor, physically smaller HDD, FDD, and CD-ROM drives, and more complicated electronic and mechanical packaging. Nevertheless, some competitors are beginning to address these consumer needs with products reminiscent of the old "luggable" computers. However of those known to date, none provide any additional capabilities over a normal PC. What is needed is a device and modular system which provides the before stated needed features and in contrast, provides significant new capabilities, as well as the enhanced portability and space savings achieved by incorporating some notebook technology into a compact desktop design with modularization.

It should be noted that there have been several recent, but failed attempts at providing small-footprint desktop PCS which utilize flat-panel displays, PCMCIA cards, and other notebook packaging techniques. So the success of another design targeted at similar goals is certainly not guaranteed. These earlier attempts, however, suffered from (1) an even higher cost differential between LCD and CRT displays than currently prevails, (2) the choice to provide a standard analog interface to a stand-alone LCD monitor, which increased costs still further, and (3) a serious lack of expandability in the small form factor boxes. The display cost differential, while still substantial, has diminished somewhat. Furthermore, the industry is moving towards the concept of a sealed PC, where expansion is accomplished through the addition of external modules connected via a high-speed serial bus such as the IEEE 1394, a.k.a. "FireWire" specification. If a small-form-factor PC can be designed so that all basic functions are provided via internal components which can be easily upgraded, and be expandability for atypical or new functions to be easily provided through industry-standard 1394-based external modules, then much of the need for a large, mostly empty system unit disappears.

SUMMARY OF THE INVENTION

Provided is a hybrid packaging design for a portable personal computer that combines elements of both desktop and a notebook computers with unique new features in detachable sections or portions to provide additional user functionality and flexibility. In a basic form, the best device comprises a tri-fold mechanical structure with, for example, a touchpad display screen and a detachable keyboard which is stowable within the case of the computer structure, but with the facility to detach the base section to provide either a substituted middle or cover section or base section which includes computer system features different than those in the section being replaced. The innovation is enhanced with features which include a touch-screen display overlay, a stylus, a wireless remote control, and various docking/support stations. The combination of these items enables a wide variety of new usage scenarios, and allows the system to receive wide acceptance from the user community and adapts well to a wide variety of home and office situations.

BRIEF DESCRIPTION OF THE DRAWINGS

The invention is pointed out with particularity in the appended claims. The stated advantages of the invention may be better understood by referring to the following detailed description in conjunction with the drawings in which:

DETAILED DESCRIPTION OF THE INVENTION

Figures 1, 1A:
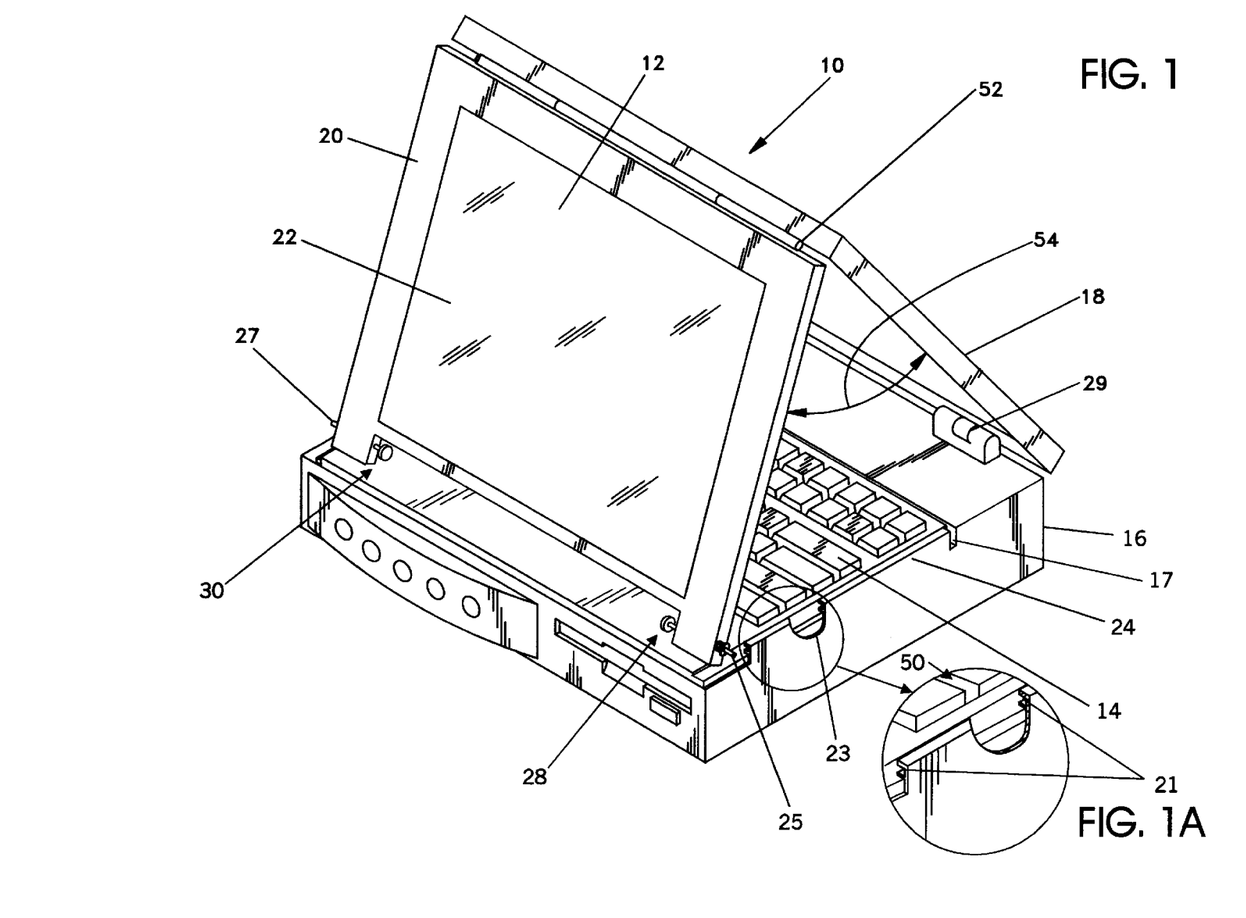
FIG. 1 is a perspective view of the foldable display screen opened across the base of the notebook computer for touchpad actuation with the stowable remote keyboard disposed within the body of the notebook according to the principles of the present invention.

FIG. 1 shows a basic position, one of several possible mechanical configurations, for the display screen 12 of the notebook computer 10 disposed in a folded fashion for easy access to the display surface 12 for operation in a touch mode. This first illustration corresponds to one of several possible usage "modes". A key element of the innovative design includes a tri-fold mechanical structure for use operationally by touch and with provision for a detachable keyboard 14. The detachable keyboard 14 is preferably a cordless model. An RF-based keyboard is preferable to one which functions through use of IR because of the advantages which arise when line-of-sight constraints can be avoided. The keyboard would typically include a built-in pointing device and preferably a TrackPoint device as designed and offered by IBM Corporation. Further, as is illustrated in FIG. 1, the keyboard is stowable within the body of the notebook computer 10 and is operational in a remote or stored position.

The tri-fold mechanical structure of the notebook computer 10 comprises a base section 16 typically housing the HDD, FDD, DVD, or CD-ROM drives, not shown but well known in the market place, and an assortment of connectors and power electronics, a middle section 18 which may contains the system motherboard and/or speakers, and a display section 20 typically housing a flat-panel display 12, a touch-screen overlay 22 which is disposed over the display 12, and optional speakers, not shown.

Figure 2:
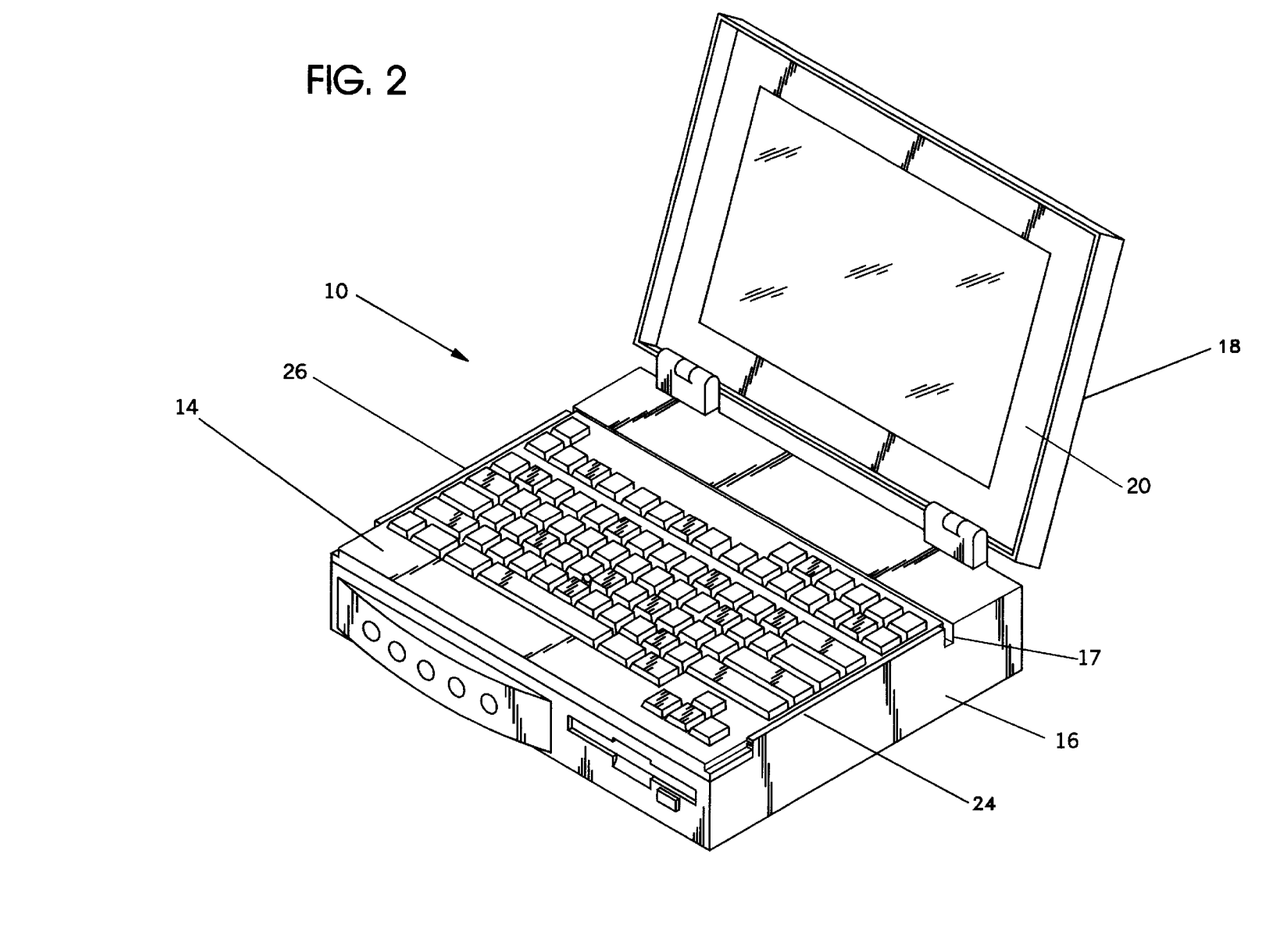
FIG. 2 is a perspective view of the foldable display screen folded back and disposed before the cover of the notebook computer for touchpad actuation with the stowable remote keyboard disposed before or in front of the display screen and over the base of the computer according to the principles of the present invention.

FIG. 1 illustrates the outside decorative side of mechanical guide rails 24 and 26, as seen in FIG. 2, that are provided along the right and left edges of the sides, respectively, of the top surface of the base section 16. Guide rail 24, is typical, and is partially broken away at area 23 and the view in circle 50 better illustrates the inter rail 21 which accommodates the slide pin 25 attached to the frame portion of the display section 20. Engaging the guide rails 24 and 26 are guide assembly connectors 28 and 30 included at the bottom two corners, i.e., right and left corners, of the display section 20. These engagement features include, by way of example, spring-loaded assembly pins 25 and 27 each with a manual release button, and can be coupled with, by snapping into, the guide rails 24 and 26 at any point along the length of the rails 24 and 26, which extend from approximately the front face of the base section 16 to the back portion where the base section 16 is joined to the middle section 18 at a first hinge 29.

These engagement features include, by way of example, spring-loaded assembly pins 25 and 27 each with a typical manual release button or knob, which can be manipulated or pulled to further compress the coil spring, and then released for the pin 25 to travel in the opposite direction to be coupled with the guide rails 24 and 26 at any selected point or location along the length of the rails 24 and 26. The rails 24 and 26 extend from approximately the front face of the base section 16 to the back portion where the base section 16 is joined to the middle section 18 at a first hinge 29 or a pair of like hinges. The assembly pins 25 and 27 can be easily guided in to and out of the guide rails 24 and 26, to be carried within the guide slot 21, at either the front and open end of each guide rail 24 and 26, or can be slide into the guide slot 21 at a more rearward location at slot opening 17, as best seen in FIGS. 1 and 2.

The assembly pins 25 and 27 can be fixed at locations along the guide rails in any of a multitude of fashions. This could be accomplished by moving the pin 25 in and out by first pulling on the knob to release the pin 25 from its location along the guide rail, changing the viewing angle of the display screen 20 and then resetting the pin 25 in a different location.

The construction of hinge 29 is exemplary and can be constructed as a live-hinge of a suitable and durable plastic polymer material or a hinge in the traditional sense having a connecting pin or rod coupling a pair of butt hinge portions each, respectively, attached to display section 20 and the middle section 18. Also the hinge may be suitably disposed, as would be a piano hinge, to extend the entire width of the display and middle sections 20 and 18, or alternatively disposed as a pair of hinges, as shown, at the outer width extremities of the display section 20. However, alternatively, if of appropriate strength and structure, the hinge can be disposed centrally approximately midway between the extremities of the width of the display section 20. This construction of the hinge's suggested alternatives apply equally as well to the hinge 52 at the upper portion of the middle section 18 and its attachment to the display section 20.

The coupling of the positioning pin assemblies 25 and 27 of guide assembly devices 28 and 30, with the guide rails 24 and 26 at any point along the guide rails, allows the display 12 to be positioned at different angles to the base section 16, which facilitates the viewing angle, at which the user observes the display screen 12. The viewing angle is a function of the folding angle 54 shown in FIG. 1. When so engaged and oriented one to the other, the display section 20 and the middle section 18 form a rigid "A-frame" structure on top of the base section 16, where the folding angle 54, as shown in FIG. 1 can vary anywhere from approximately 0 degrees to 60 degrees, as shown here. In fact, as illustrated in FIG. 3, the folding or viewing angle 54 may vary anywhere from an angle formed when the display is housed tight up against the inside surface of the middle section 18, as illustrated in FIG. 2, which at that position approximates an angle of zero degrees, to an extended position when the display section is laid substantially flat-out beyond the point where its corners are coupled with the guide rails, to form an angle with the middle section 18 of approximately one hundred eighty degrees.

Figure 4:
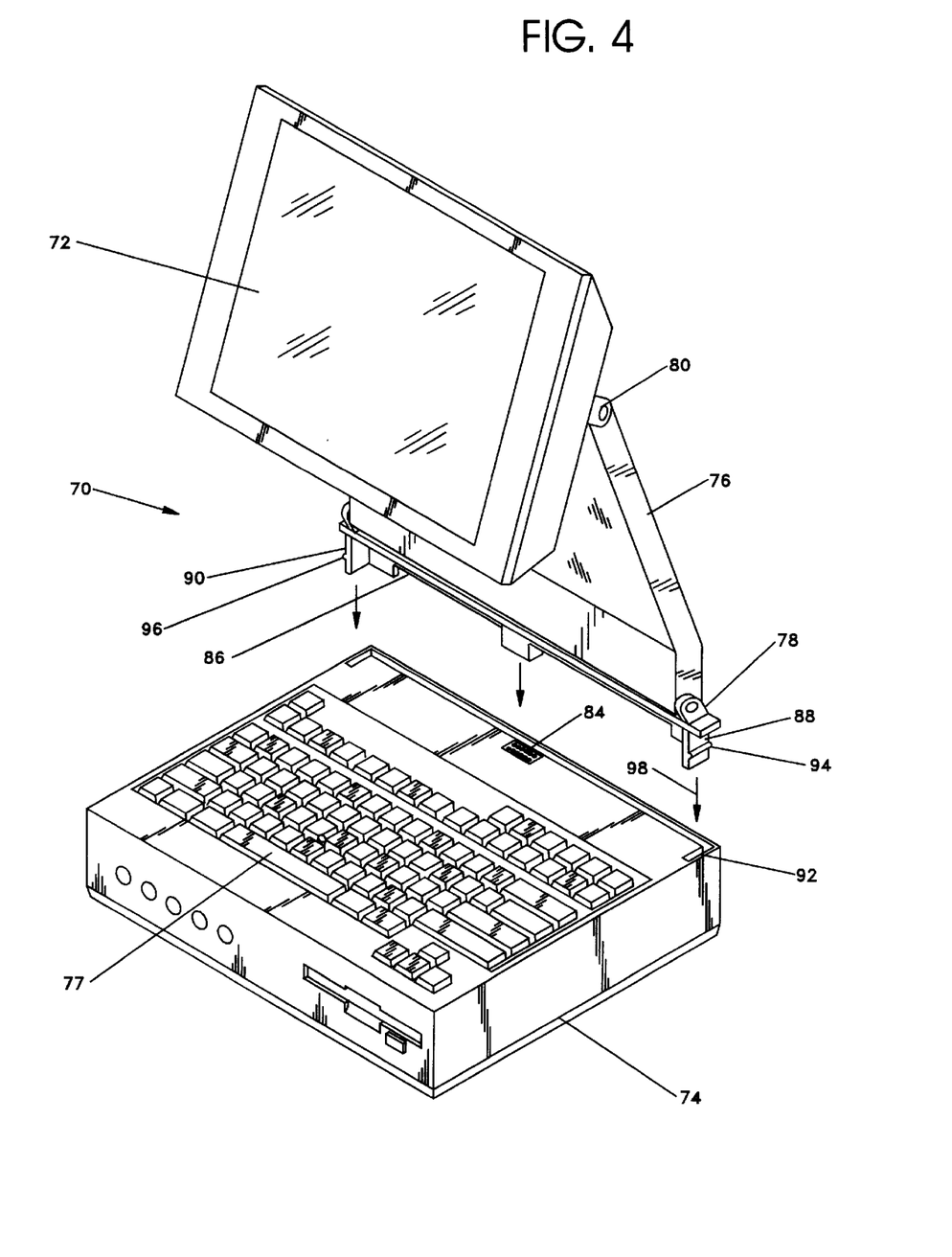
FIG. 4 is an alternate embodiment of the notebook computer with the display and cover attached to pivot about hinged portions and to be detachable from the base section.
Figure 5:
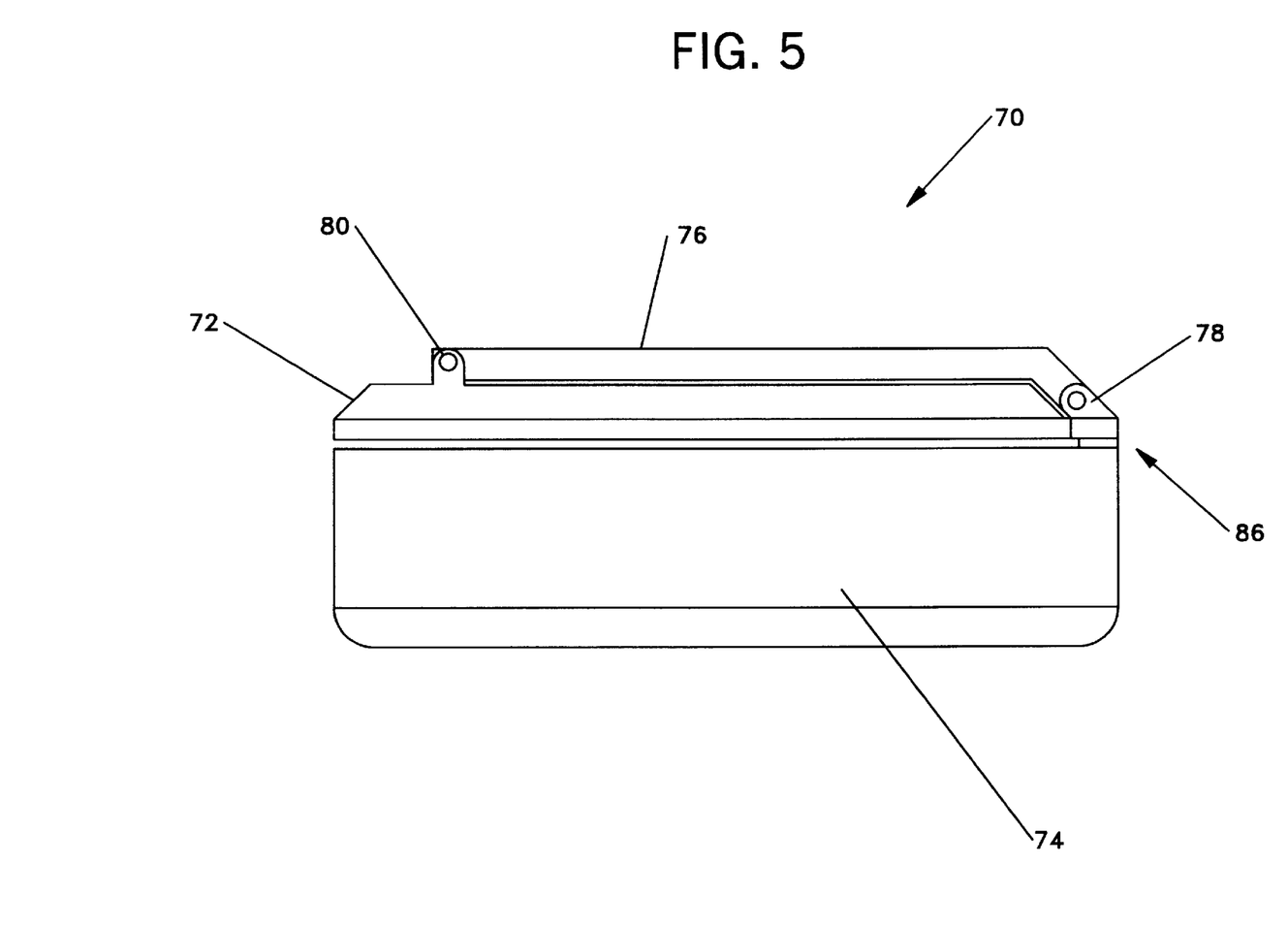
FIG. 5 is a view of the notebook computer of FIG. 4 displayed in a closed position.

The positioning of the angle of the display screen 12 can be varied infinitely along the guide rails 24 and 26 by any accommodating device or assembly which provides a fixed location by a pressure clamping method or, alternatively, the angle could be fixed by predetermined locator holes or detents which provide a gradation for positioning at marked or specifically identified positions. This later means and method for positioning provides for consistent positioning time after time when the display screen is removed for usage and then stored and subsequently removed for usage again. It will also be appreciated that the engagement and positioning of the display section 20 relative to the base section 16 base section 16 may be accomplished by means of a positioning clip or other device or assembly on only one side of the display section 20. The foldable and pivotable aspects of the display section 20 with respect to the middle section 18 are such that an appropriate clamping device or brake or drag could be constructed to exist in or about the hinge 52 connecting these two sections and no further holding device would be necessary. Depending on the construction of the hinge, as for example as seen in FIGS. 4 and 5, resistance can be incorporated into the hinge to hold the display section and/or back cover in any desired position or orientation with respect to its adjoining section.

Figure 3:
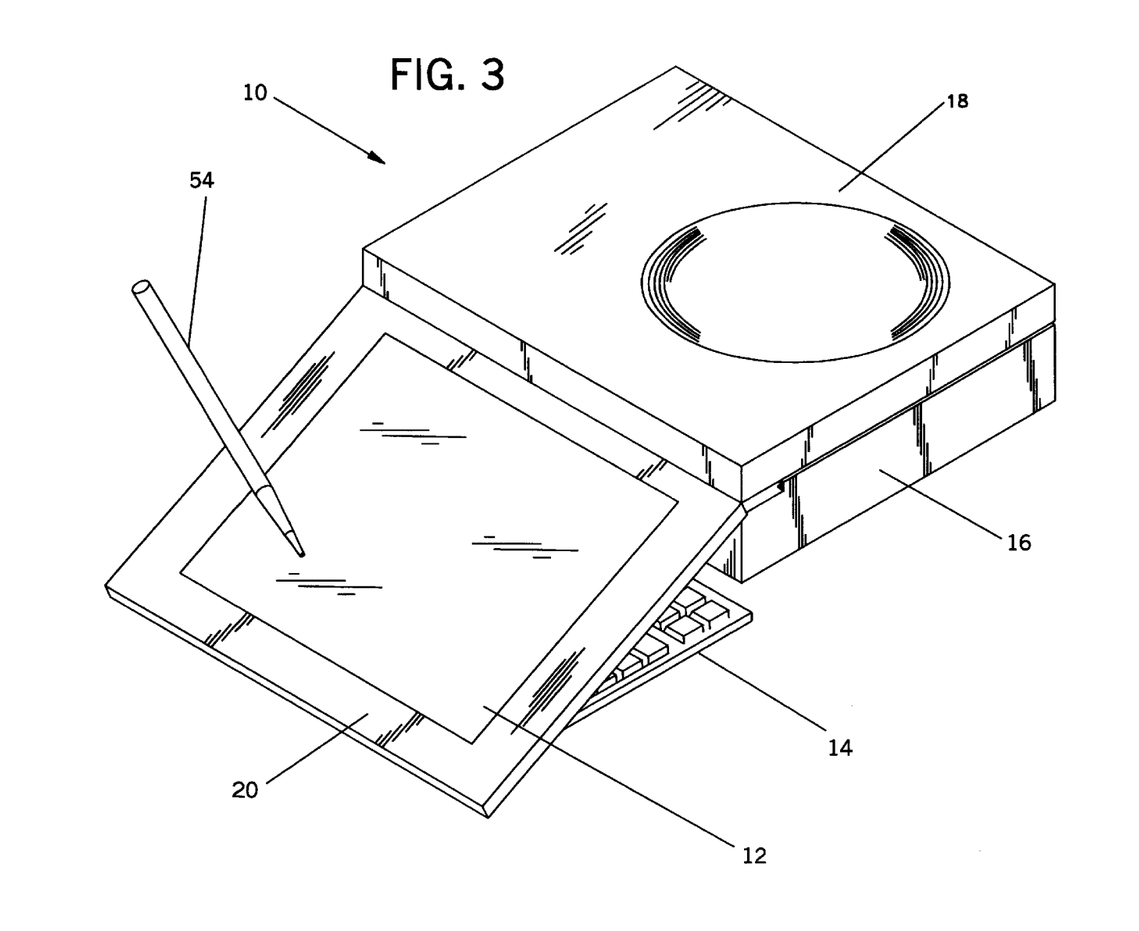
FIG. 3 is a view of the notebook with the cover partially closed and the display screen laid flat and disposed before the notebook computer for touchpad actuation according to the principles of the present invention.

It will be appreciated that, when viewed at right angles to a normal line of sight of an operator, the formed A-frame is of triangular shape and the triangle is formed by the edges of the display section 20 constituting one leg of the triangle, and the middle section 18 constituting another leg of the triangle, but whereas the third leg of the triangle substantially constitutes (i) some portion of the depth of the base section, (ii) all of the depth of the base section or (iii) all of the depth of the base section plus some distance equal to as much as the height of the display section when the display is laid out substantially flat in front of the base section as seen in FIG. 3. The triangular shape in its extended form, when the display section 20 is brought forward to its outer most disposition, essentially forms a flat plane and the triangular shape theoretically disappears to a straight line when viewed from the side.

The rigidity allows for convenient touch-screen operation of the computer when an appropriate touch-overlay 22 is provided. It prevents the display 12 from wiggling or moving with respect to the other sections of the notebook computer 10 when the user presses on the screen 12. Other significant aspects and feature details will be appreciated through the following description of the remaining figures.

The tri-fold design structure and detachable keyboard 14, can be adapted for a traditional notebook design, as well as for a hybrid desktop/notebook configuration, or solely as a desktop configuration. To address a traditional mobile market, the computer unit would include a low-power processor with sophisticated energy management, as well as a 2.5-inch HDD and slim, lightweight versions of the FDD and CD-ROM, etc. To address the market for small-footprint desktop units, each unit can provide more processing power at lower cost by using a normal desktop processor. Also, a half-height CD-ROM/DVD player, a 3.5-inch HDD, or other desktop components are used to further improve the cost/performance of the system. The system is operational with an installed battery to provide a minimal amount of battery-powered operation, or the system could have no battery and be designed for AC-operation only.

Provided is an electrical and mechanical structure whereby the system motherboard is housed in the middle tri-fold section 18, and where a portion of or the entire outside surface of the middle section 18, i.e., the top of the unit or portions thereof acts as a heatsink for the processor and other electronics packaged directly under that surface. This architecture also allows the use of a short cable, possibly a flat cable, passing through hinge 52 to connect the LCD 12 and the touch screen 22 packaged in the display section 20 to the processor and graphics-controller packaged in the middle section 18. In a preferred embodiment, a second cable will carry a system bus or other individualized signals, as required, through hinge 29 between the motherboard packaged in the middle section 18 and the HDD, FDD, CD-ROM, and I/O connectors in the base section 16. In addition, the middle section is ideally suited for housing a number of audio speakers, including, for example, those best suited for the bass audio tones. The bass performance of such speakers is maximized and best accomplished by disposing the speakers within the more unrestricted and large air spaces within the middle section.

As can be seen, there are a wide variety of specific product implementations that can be created using the tri-fold configuration. Rather than describe all possibilities made obvious by this disclosure, this application will cover primarily the design for a transportable desktop unit. Those skilled in the art will recognize other product possibilities.

The estimated dimensions for a system which includes a half-height slot in the base 16 and a desktop processor in the middle section 18 are approximately 12 inches wide, 10 inches deep, and 3.5 inches tall. While this would be considered large for a notebook, it is actually considerably smaller than a typical home VCR. The base section 16 in the illustration of FIGS. 1 and 2 includes a full half-height slot to allow the use of a traditional desktop DVD or CD-ROM drive. To keep the overall volume and weight of the unit 10 on the lower side, however, and to provide more shock resistance during times of mobility of the unit 10, the unit 10 can use a notebook style, slim HDD.

In the configuration shown in FIG. 2, the display 12 might be considered by some to be positioned farther away from the user than is preferred. If so, a second hinge 52 located between the display section 20 and the middle section 18 provides for the display 12 to be swung or moved forward at the bottom edge of the display section 20, as shown in FIG. 1. In this mode, the user has the choice of using the mouse (not shown), an optional remote control (not shown), or the touch-screen 22 to control the system 10. The user can also change the display angle 54 by repositioning the bottom edge of the display 12 at any position or point along the top of the base section 16 as provided for herein. The display 12 can be configured and sized to fit within the cover or middle section 18, or the cover 18 can be only a partial cover providing for the back side of the display section 20 to constitute at least part of the cover for the computer 10 when closed.

The supports for the bottom edge of the display section 20, are designed to allow sufficient space between the display and the base section to allow the keyboard 14 to be slid into and out of its storage location even when the display is positioned as shown in FIG. 1.

FIG. 1 shows the system 10 when the keyboard 14 has been slid into its storage location atop the base section 16. This mechanical configuration makes the system have an appearance which looks very much like a typical TV or a touch-screen kiosk. By de-emphasizing the presence of and essentially hiding the keyboard 14 in this mode, while still keeping it readily available if needed, the system 10 becomes much less intimidating to some, including a casual or novice user. Operation of many basic computer functions (e.g., answering machine, audio-CD player, message center, TV and/or DVD or however otherwise suitably equipped) can easily be accomplished using only the touch-screen interface 22, which can be accomplished through use of any of a multitude of overlays or graphical on-screen interfaces for which the computer system 10 has been or can be programmed.

For those instances when a user has soiled or dirty hands and does not want to touch the screen display 12, a simple stylus 54 can be provided, as illustrated in FIG. 3 in order that the user can pick up the stylus 54 and use it instead of their finger as a touch instrument on the overlay 22. Additionally, by making the interface simple enough to operate via touch-screen, the system 10 is also practical enough to operate using a remote control, similar to the remote control for the TV, which contains a cursor control device and a single click button.

In addition to the basic computer functions above, users may also find many other more complicated applications that can easily be controlled without a keyboard. Web browsing in general, and PointCast operation in particular, are some additional possibilities.

FIG. 3 shows the system after the display 10 has been disengaged from the support rails 24 and 26 on the edges of the base section 16 and brought even farther forward, until the display is positioned close to the user and almost parallel to the table-top, thereby extending the folding or viewing angle to approximately 180 degrees. In FIG. 2 the keyboard 14 is stowed on top of the base section 16, however if the keyboard 14 had already been placed on the table in front of the base unit 10, as shown in FIG. 3, the display section 20 would simply extend out over the keyboard 14, with the front edge of the display section resting on the table as illustrated. This mechanical configuration is ideally suited to pen-based or stylus operation of the computer unit 10. In addition to supporting traditional, but not very widely adopted pen-computing applications, this configuration may find widespread use (i) by children working with art programs (e.g., the KidPix program) where drawing is difficult because of the requirement to manipulate the mouse, (ii) for digital photo touch-up and manipulation where operating directly on the image is more natural than using a mouse, or (iii) for quickly jotting down a phone number or other quick note when a keyboard is not convenient.

Since the presented configurations of the device in product form can be used in several different environments in the home, there are several optional types of docking stations that are useful. One such is for use in a home-entertainment center. A further option, useful in certain home kitchen environments, is a swiveling base such as a lazy-susan docking station which allows the system to rotate at least a plus-or-minus 180 degrees without cable interference or the dragging of cables around. The lazy-susan platform consists of an external AC adapter and a DC power cord which extends to the swivel base and coils around inside the base sufficiently to allow the base to rotate at least plus or minus 180 degrees. To further simplify the cabling, the AC-adapter brick can also include an RJ-11 jack for a regular telephone connection, and/or a cable-TV input jack. Signals from the phone line and cable TV coax plugged into the AC-adapter brick can be brought up to the swivel base through a single appropriately shielded and constructed cable, and then into the base unit 10 which, for convenience, can be placed on a kitchen counter with full telephone, power, and TV connectivity, but with only one visible cable required on the counter. Furthermore, this system is free to rotate without moving this cable.

A further environmental orientation has the computer unit 10 disposed atop of a kitchen counter in a traditional notebook mode, but placed upon the top of the swivel base system, and opened in a fashion to provide the normal notebook style configuration. In this configuration the unit 10 appears very 'computer-like' and possibly does not appear as a usual or desirable kitchen tool or utensil and something that all consumers possibly want in their kitchen. Notwithstanding this, the design concept can easily be reconfigured so as to blend in more appropriately with the kitchen environment, as follows. More suitable and acceptable perhaps is what can be described as a kitchen counter kiosk/TV mode.

The kiosk style on the kitchen counter is a very suitable configuration for TV watching, display of PointCast graphics or other similar information, music-CD playing, and answering-machine/message-center operation. In all cases, the system 10 can easily be swivelled to allow for viewing from various locations around the kitchen. To operate the system, the consumer has the choice of using the touch-screen with overlay 22 or an optional wireless remote control.

Since consumers often have wet or soiled hands while working in the kitchen, operating the system 10 with the touch screen 22 may not always be appropriate or convenient. For this reason, the system is adapted to include a simple plastic stylus 54 held, when not in use, in a conveniently located position to be easily grasped. Users with wet or soiled hands can simply pick up the stylus from its docking holder, use it instead of their finger to touch the screen 12, and then replace the stylus 54 in the convenient holder. Later, the user can simply wipe or rinse off the plastic stylus 54 as necessary if it is soiled. When configured in the kiosk style, a stylus 54 can be positioned in a pencil well on the side of the machine unit 10.

While many computer functions can be performed through the touch screen 22 or the remote control 38, many other tasks such as e-mail are still best handled with a keyboard 14. In those cases, the keyboard 14 can be easily removed from its stowed position above the bottom section 16 and placed directly on the counter.

In some particularly space-constrained locations, such as a small office cubicle or the space under a kitchen cabinet, it is also possible to mount the computer unit vertically. This is achieved either through the use of an appropriate stand or docking station, which provides freestanding support for the unit, or the system can be mounted directly to a wall or other vertical surface. In the vertical closed configuration, the system 10 has an extremely small footprint, or even zero footprint if mounted on the wall, and valuable desk or counter space is available for non-computer uses.

The system can be mounted vertically in a portrait mode and with the display opened in portrait fashion, thereby forming a sort of 'vertical kiosk' configuration. In this configuration, the keyboard 14 is stowed vertically in its normal location, and a modified device driver for the display would be used to rotate all graphic output into portrait mode, instead of normal landscape mode. Such device drivers exist for most operating systems, and many people feel that portrait mode is actually more natural then landscape mode for many activities such as document processing and/or web-browsing. Portrait Displays Pivot 1700 product available from Portrait Displays Inc. Pheasanton, Calif., is such a suitable driver system where switching from landscape to portrait orientations can be done on the fly, with no need to reboot.

By creating a tri-fold frame structure which combines the top surface of the base section 16, the inside surface of the middle section 18, the inside surface of the display section 20 and the two hinges 29 and 52 into one unified mechanical structure, the external dimensions of the unit 10 can be determined using easily interchangeable covers which mount to the frame to enclose the components. The attachment of differing covers or bases is accomplished by ensuring that the hinges of each are universal and readily match with a mating portion of a hinge on the base being assembled to the cover or visa versa. This ability to easily provide two or more different base units 16, for example, one containing a half-height slot, another of a thinner variety requiring all or some so-called slim components and yet another being a thicker package that provides better cooling and/or an expansion slot, as well as two or more different sets of electronics of possibly different thicknesses in middle section 18, allows for a full range of product configurations for economic development and manufactureability using a common tri-fold structure.

As further shown in FIG. 4, a computer unit 70 is illustrated as comprising a top assembly, including a display section 72 hinged to a middle or back section 76, and a bottom assembly, including a base section 74. A keyboard 77 is located on top of the base section 74 and can be removed for convenient usage.

FIG. 5 illustrates the computer unit 70 in a closed position and further illustrates the hinged arrangements of the middle or back section 76 to the display section 72 at hinge 80, and to a base connecting assembly 86 at hinge 78. Hinges 80 and 78 are only shown from the right side of the computer unit 70, but it will be appreciated that complementary hinges are disposed on the opposite or left side of the computer unit 70. Further, it should be appreciated that the hinge 80 and its complementary hinge at the opposite end, can be positioned at any of a number of locations or attitudes on the back side of the display section 72. So, for example, even though the illustrated hinge 80 is at the upper end or approximate top of the back side of the display section 72, in order to provide a different articulation for the display section 72, the hinges could be disposed farther down the back side of the display section 72 and, for example, could be disposed at or near the bottom of the back side of display section 72, even to the point where hinge 80 is not necessary and the hinge 78 could be directly connected to the display section 72.

The base connecting assembly 86 provides structural support along the width of the computer unit 70 and has leg portions 88 and 90 on the right and left ends of the base connecting assembly 86, respectively. The base connecting assembly 86, including its legs 88 and 90, is configured for insertion into the accommodating slot 92 on the upper surface of the base section 74, as illustrated in FIG. 4. To ensure insertion to a full and proper depth, exemplary, locking and locating bump-like protrusions 94 and 96 are formed on leg portions 88 and 90, respectively. When the legs 88 and 90 are inserted into the slot 90, they are pushed down in the direction of arrow 98 until such time as the protrusions 94 and 96 are within accommodating recesses (not shown) in the base section 74 at each end of and within the slot 90. Proper insertion will, for example, be accomplished when the protrusions 94 and 96 snap into the identified recesses. Also when insertion at the proper depth is accomplished, a satisfactory electrical connection will have been made between the mating electrical part 82, in the base connecting assembly 86, and the mating electrical part 84, in the base section 74, of the illustrated electrical connector. When the assembly is completed, positive electrical continuity is achieved. Other methods of achieving connection and positive electrical continuity are possible. It will be appreciated that appropriate electrical connection is made between the pivotable back section 76 and the electrical part 82 to electrically connect components in the back section 76 and in the display section 72.

With the facility of easily changing the top portion of the computer unit 70, or the bottom portion, as provided herein, it will be appreciated that a myriad of possible applications and computer features can be experienced by the user without undue burden of a bulky system. Further, the user can selectively choose which assembly combinations are best suited for the user's purpose and can make these choices in the most economical manner.

Although the present invention and its advantages have been described in detail, it should be understood that various changes, substitutions and alterations can be made herein without departing from the spirit and scope of the invention as defined by the appended claims.

What is claimed is:

1. A computer system assemblage comprising:

a base section assembly having a keyboard, a planar middle section assembly connected to rotate and to be detached from the base section assembly with a first hinge assembly having a first longitudinal axis of rotation for rotation of the planar middle section assembly relative to the base section assembly and with an attachment structure for matably connecting to and for detaching from the base section assembly, and a planar display section assembly, including a display screen, pivotally connected to the planar middle section assembly with a second hinge assembly having a second longitudinal axis of rotation which second longitudinal axis of rotation is parallel to the first longitudinal axis of rotation for rotation of the planar display section assembly relative to the planar middle section assembly.

2. The computer system assemblage as defined in claim 1, wherein the three section assemblies can be folded flat such that the display section assembly is sandwiched between the middle section assembly and the base section assembly and that all three of the section assemblies form generally parallel planes.

3. The computer system assemblage as defined in claim 1, wherein the three section assemblies are foldable to form a generally triangular shape when viewed in cross section with the base section assembly forming the base of the triangle, and the middle detachable section assembly and the display section assembly forming the other two sides of the triangle, including registration means to temporarily retain one edge of the display section assembly at one of many possible locations along the depth of the base section assembly to provide for stability for the triangular shape and registration of the display section assembly at any one of the many possible locations along the base section assembly, wherein the shape of the triangle varies when viewed in cross section as a function of the location of the registration means along the depth of the base section assembly.

4. The computer system assemblage as defined in claim 3, further comprising a device for temporarily retaining one edge of the display section assembly at one of many possible locations along the length of the base section assembly.

5. The computer system assemblage as defined in claim 3, wherein the registration means comprises a pin assembly attached to the planar display section assembly and includes a pin for engaging the base section along a guide rail formed as a part of and disposed along the depth of the base section assembly.

6. The computer system assemblage as defined in claim 5, wherein the pin of the pin assembly engages depressed formations in the guide rail formed as a part of the base section assembly.

7. The computer system assemblage as defined in claim 5, wherein the pin of the pin assembly matingly engages a material included as a part of the guide rail, to displace the material upon engagement of the pin with the material to form a depression within the material during engagement therewith, wherein the material is resilient and reforms to eliminate the depression upon disengagement of the pin and the material.

8. The computer system assemblage as defined in claim 5, wherein the pin of the pin assembly is spring biased to bias the pin toward the guide rail formed as a part of the base section assembly.

9. The computer system assemblage as defined in claim 3, wherein the registration means comprises an engaging mechanism attached to the planar display section assembly at a portion of the planar display section assembly disposed immediately above the base section assembly for engaging structure included as a part of the base section assembly and disposed along the depth of the base section assembly.

10. The computer system assemblage as defined in claim 1, wherein the second hinge assembly is electrically connected to the base section.

11. The computer system assemblage as defined in claim 10, wherein the second hinge assembly has positioning legs which are insertable into the base section assembly.

12. The computer system assemblage as defined in claim 11, where the positioning legs mechanically lock the second hinge assembly to the base section assembly.

13. The foldable computer system assemblage as defined in claim 1, where solid state computer electronics, including a processor, memory, and controllers are selectively packaged in either of the computer middle section assembly and the computer base section assembly, and wherein the computer base section assembly is removable from the computer middle section assembly, and the computer middle section assembly is removable from the computer display section assembly, for replacement, respectively, by a new feature computer base section assembly and a new feature computer middle section assembly, for providing different computer operational features than provideable by the removed section assemblies.

14. The foldable computer system assemblage as defined in claim 1, wherein the computer middle section assembly is removable from the computer display section assembly, for replacement by a new computer middle section assembly for providing different computer operational features than provideable by the removed section assembly.

15. The foldable computer system assemblage as defined in claim 1, wherein the first hinge assembly is attached to the display section assembly to provide for pivotal rotation of the display screen about an axis at the top of the display section assembly.

16. The foldable computer system assemblage as defined in claim 1, wherein the first hinge assembly is attached to the display section assembly to provide for pivotal rotation of the display screen about an axis at the bottom of the display section assembly.

17. The foldable computer system assemblage as defined in claim 1, wherein the second hinge assembly is attached to the display section assembly to provide for pivotal rotation of the display screen about the second longitudinal axis substantially at the middle of the display section assembly.

18. The foldable computer system assemblage as defined in claim 1, wherein the display section assembly includes a touchpad display section.

19. The computer system assemblage as defined in claim 1, wherein the three section assemblies are folded nearly flat, with the planar middle section assembly and the base section assembly forming generally parallel planes, and with the display screen of the planar display section assembly capable of touch screen operation, and disposed predominately outside of the space formed between the base section assembly and the planar middle section assembly, and oriented to provide a substantially flat display screen work space for touch screen operation.

20. The computer system assemblage as defined in claim 1, wherein a substantial portion of the solid state computer electronics, including processor, memory and controllers, are packaged in the middle section assembly, and audio speakers are disposed within the middle section assembly for maximizing bass responses from the audio speakers, wherein the outside surface of the middle section is a heatsink for the computer electronics.

21. The computer system assemblage as defined in claim 20, wherein the base section is disposed upon a docking station which is rotatable.

22. The computer system assemblage as defined in claim 1, wherein the attachment structure of the planar middle section assembly interconnects with the base section assembly to support the planar middle section assembly to pivot at the first axis of rotation to rotate relative to the base section assembly.

23. The computer system assemblage as defined in claim 22, wherein the attachment structure of the planar middle section assembly includes legs for insertion into recesses in the base section assembly and locators for positive registration of the planar middle section assembly to the base section assembly.

24. The computer system assemblage as defined in claim 23, wherein the locators are protrusions on the legs of the planar middle section assembly which snap into recesses in the base section for matingly engaging the planar middle section assembly and the base section assembly to provide for positive mechanical and electrical connectivity for operation of the computer system.

25. A computer system comprising:

a base section having a keyboard, wherein the base section is structured for quick connect to and disconnect from other computer system sections;

a planar middle section as one of the other computer system sections structured for quick connect to and disconnect from and for matingly engaging the base section at a first hinge having a first longitudinal axis of rotation for rotation of the planar middle section relative to the base section; and a planar display section, including a display screen, pivotally connected to the planar middle section with a second hinge having a second longitudinal axis of rotation which second longitudinal axis of rotation is parallel to the first longitudinal axis of rotation for rotation of the planar display section relative to the planar middle section, wherein the base, middle and display sections are foldable to form a generally triangular shape when viewed in cross section with the base section forming the base of the triangle, and the middle section and the display section forming the other two sides of the triangle.

26. The computer system as defined in claim 25, further including a registration system including a biased pin assembly to temporarily retain one edge of the display section at one of many possible locations along the depth of the base section to provide for stability for the triangular shape and registration of the display section at any one of the many possible locations along the base section, wherein the shape of the triangle when viewed in cross section varies as a function of the location of the biased pin assembly along the depth of the base section, and the biased pin assembly, attached to the planar display section, further including a pin biased by a spring and biased toward a guide rail of the registration system formed as a part of and disposed along the depth of the base section.

27. The computer system as defined in claim 26, wherein the guide rail of the registration system formed as a part of and disposed along the depth of the base section, includes depressed formations for engagement of the pin biased by the spring.

28. The computer system as defined in claim 26, wherein the guide rail of the registration system formed as a part of and disposed along the depth of the base section, includes a material deformable by engagement of the biased pin and resilient to regain an original form after disengagement by the biased pin.

29. The computer system as defined in claim 25, wherein the structured portions of the base section and the planar middle section interconnect to support the planar middle section to pivot at the first axis of rotation to rotate relative to the base section.

30. The computer system as defined in claim 25, wherein the structured portion of the planar middle section includes legs for insertion into recesses in the base section and locators for positive registration of the planar middle section to the base section.

31. The computer system as defined in claim 30, wherein the locators are protrusions on the legs of the planar middle section which snap into recesses in the base section for matingly engaging the planar middle section and the base section to provide for positive mechanical and electrical connectivity for operation of the computer system.

32. The computer system as defined in claim 25, wherein the quick disconnect middle section can be quickly disconnected from the base section, for replacement by a new middle section for providing different computer operational features than provideable by the quickly disconnected section.

* * * * *